United States Patent Office 3,819,736
Patented June 25, 1974

3,819,736
PROCESS FOR CONVERSION OF ALKYL AROMATIC HYDROCARBONS
Yuji Sato and Hideyuki Takahashi, both c/o Mitsubishi Petrochemical Co., Ltd., Technical Development Research Laboratory, 1 Toho-cho, Yokkaichi, Japan
No Drawing. Continuation-in-part of abandoned application Ser. No. 142,405, May 11, 1971. This application Nov. 14, 1972, Ser. No. 306,290
Int. Cl. C07c 3/62
U.S. Cl. 260—672 T                5 Claims

ABSTRACT OF THE DISCLOSURE

A disproportionation and transalkylation of an alkyl-aromatic hydrocarbon can be conducted by use of a supported catalyst of a mordenite carrying a combination of Zr and another metal selected from the group consisting of Bi, Nb, Ag, Cu, Mo, Sb and Y.

CROSS REFERENCE TO RELATED APPLICATION

This application is a Continuation-In-Part of copending application Ser. No. 142,405, filed May 11, 1971 and now abandoned.

BACKGROUND OF THE INVENTION

Field Of The Invention

This invention relates to a process for the disproportionation and the transalkylation of alkyl aromatic hydrocarbons.

Description Of The Prior Art

Various processes for disproportionating and transalkylating alkyl aromatic hydrocarbons have been disclosed in the prior art, however, many of those processes have been found to be at least partially unsatisfactory when used on a large-scale industrially acceptable basis.

It has been disclosed that H-mordenite or H-faujasite of zeolite was used as a catalyst for disproportionating alkyl aromatic hydrocarbon. See *Journal of Catalysis;* Volume 8, Page 371 (1967). However, the types of catalysts disclosed in that reference have relatively low conversion activity and poor selectivity etc. It has been known that catalysts made of zeolite and catalytic metals such as Ag, Ni were used for disproportionation of toluene, however, only about 40% conversion was previously obtainable. Most conventional catalysts suffer from the disadvantages of low catalytic activity, low durability, and small liquid space velocity.

SUMMARY OF THE INVENTION

Accordingly, it is an object of this invention to provide a novel process for disproportionation and transalkylation of alkyl aromatic hydrocarbons at a high rate and high degree of conversion and at high selectivity.

It is another object of this invention to provide a process for disproportionation and transalkylation of alkylaromatic compounds to decrease non-aromatic components especially, non-aromatic components having boiling points similar to the boiling point of benzene.

It is still another object of this invention to provide a novel process for disproportionation and transalkylation of alkyl aromatic hydrocarbons in the presence of a durable catalyst having remarkably good activity.

These and other objects have now been attained by a process for disproportionation and transalkylation of an alkylaromatic hydrocarbon by use of a supported catalyst of a mordenite carrying a combination of Zr and another metal selected from the group consisting of Bi, Nb, Ag, Cu, Mo, Sb, and Y.

DETAILED DESCRIPTION OF THE PREFERRED EMBODIMENTS

The starting materials of the process of this invention are alkyl aromatic hydrocarbons, which include toluene, xylene, ethyl-benzene, pseudocumene, mesitylene, ethyltoluene, hemimellitene, cumene, isodurene, durene and cymene, and mixtures of said compounds with other alkyl aromatic hydrocarbons or other hydrocarbons, such as benzene.

The mordenite carriers used in this invention are preferably the synthetic mordenite. The mordenite can be used as a carrier for the specific catalytic metal, although it is preferred to use the mordenite after replacing the alkali metal of said mordenite with the specific catalytic metal.

In order to increase the mechanical properties of the resultant catalyst, it is possible to admix an acid clay, silica-alumina, silica, alumina and activated clay or other clay with the mordenite as a binder. The catalytic metals of Zr, Nb, Bi, Ag, Cu, Mo, Sb and Y can be carried by various processes and preferably by ion-exchange.

In supporting the catalytic metal, a variety of compounds can be used, including zirconyl nitrate, zirconium chloride, zirconium sulfate, niobium pentachloride, bismuth nitrate, bismuth oxide, bismuth phosphate and bismuth hydroxide.

Other metal compounds, such as silver nitrate, copper nitrate, antimony trichloride, antimony oxide and ammonium molybdate can be used in combination with the catalytic metal. Good results are obtainable when the catalytic metal is supported on the mordenite by an ion-exchance technique. It is possible, however, to apply the catalytic metal salt to the mordenite by heat reducing a salt of said metal in the presence of hydrogen.

Thus, when using the present catalyst the hydrocracking of aromatic compounds forming non-aromatic compounds is highly controlled and the life of the catalyst is remarkably increased.

It is preferable to carry 0.01–10 wt. percent, especially 0.02–5 wt. percent of Zr on the mordenite, and it is preferable to carry 0.01–20 wt. percent, especially 0.05–10 wt. percent of Bi, Nb, Ag, Cu, Mo, Sb or Y on the mordenite together with Zr.

The ratio of Zn used relative to the second metal component of the catalyst is 1:0.1–20 and preferably 1:1–20. Best results are attained at a ratio of 1:1–10. The ratio of Zr to the metal selected from Bi, Nb, Ag, Cu, Mo, Sb or Y to Zr is usually 1:0.1–20, preferably 1:1–20, especially 1:1–10.

Where the quantity of catalytic metal on the mordenite is too high, the active surface area of the catalyst will be decreased and the activity of the catalyst will be decreased. Moreover, use of an excess quantity of catalytic metal is uneconomical in view of the relatively high cost of the catalytic metal.

In order to prepare a high crush strength catalyst, characterized by high catalytic activity, it is preferable to use an acid clay, an activated clay, a silica-alumina or an alumina as a binder for the mordenite. Best results are obtainable when 3–95 weight percent of the binder is used with the mordenite. Where the amount of binder used is less than 3%, the strength of the carrier will be insufficient, and if it is greater than 95%, the catalytic activity will be decreased, although the crush strength will be quite high. Suitable acid clays used for this purpose are those having a specific area of 100–200 m.²/g. and suitable activated clays, are those having a specific surface area of 200–350 m.²/g.

One suitable method for preparing the catalyst of this invention will now be described:

An aqueous solution of an ammonium salt, such as ammonium nitrate, ammonium chloride, ammonium sulfate or ammonium acetate is passed through a powdered or pelleted mordenite layer to exchange the sodium ion for an ammonium ion. When pellets are used, the pellet diameter may be from 1 mm.-7 mm. The entire amount of the contained Na ion can be exchanged, however, partial Na ion-exchange is acceptable. An ammonium type mordenite is obtained as a result of the ion exchange process. Excess ammonium salt absorbed onto or adhered to, the ammonium type mordenite can be removed by water washing, although this is optional, and good results may be obtained even without the removal of the non-ion exchange ammonium salts. The resultant product is dried at 50–300° C. Ion exchange of zirconium is then accomplished by immersing the ammonium mordenite into an aqueous solution of zirconium ion compound, mordenite for several hours, at between room temperature and 100° C.

The partially Zr ion-exchanged ammonium type mordenite is dipped in an aqueous solution of a salt of Bi, Nb, Ag, Cu, Mo, Sb or Y at the room temperature −100° C. for several hours to carry the combination of Zr and said metal. The higher the temperature, the faster will be the ion-exchange rate, and the shorter will be the ion-exchange period.

The mordenite thus provided is then washed with water, dried and carefully heated to 300–1000° C. for several hours. If the heating is too rapid the crystalline structure of the zeolite may be damaged.

The disproportionation and transalkylation of an alkyl aromatic hydrocarbon can then be conducted by using the catalyst under various reaction conditions, such as at a temperature in the range of from about 200° C. to 800° C., under atmospheric, high or low pressures and at the rate of 0.1–20 hour$^{-1}$ of liquid hourly space velocity (LHSV).

It is possible to introduce hydrogen with the starting material in the range of 0–20 molar ratio of hydrogen to the alkyl aromatic hydrocarbon. Where hydrogen is introduced in the disproportionation and transalkylation process, it is possible to maintain the activity of the catalyst for a longer period of time.

It is also possible to introduce an inert gas, such as nitrogen into said reaction system of conversion of alkyl aromatic hydrocarbon.

Having generally described the invention, a further understanding can be attained by reference to certain specific Examples which are provided herein for purpose of illustration only and are not intended to be limiting in any manner unless otherwise specified.

EXAMPLES 1–7

A boiling solution of 8 weight percent of ammonium nitrate was passed through pellets of mordenite of 4 mm. diameter and 4 mm. length to exchange the sodium ion of said mordenite with ammonium ion. The product was repeatedly washed with water to remove completely ammonium nitrate residue. The resultant product was dried at 150° C. and then was ion-exchanged to convert part of the ammonium ion to zirconium ion by adding an aqueous solution of the zirconyl nitrate in predetermined catalytic amounts of said metal ion component at 90° C. for 2 hours.

The resultant product was repeatedly washed with water and was dried. The resultant product was further ion-exchanged by adding an aqueous solution of each of silver nitrate, bismuth nitrate, copper nitrate, antimony trichloride, ammonium molybdate, niobium nitrate or yttrium nitrate, in predetermined catalytic amounts at 90° C. for 2 hours. Each product was washed with water and was dried at 150° C. and was further heated at 600° C. for 2 hours, to obtain each catalyst used in the following examples:

The disproportionation of toluene was conducted using 100 ml. of said catalyst at 500° C. at a pressure of 50 kg./cm.$^2$ G and a liquid hourly space velocity (LHSV) of 2 hr.$^{-1}$, at a molar ratio of $H_2$ to toluene of 5:1.

The results are summarized in Table 1.

TABLE 1

| Example | 1 | 2 | 3 | 4 | 5 | 6 | 7 |
|---|---|---|---|---|---|---|---|
| Catalytic metal | Zr-Ag | Zr-Bi | Zr-Cu | Zr-Mo | Zr-Sb | Zr-Nb | Zr-Y |
| Amount of metal (wt. percent) | Zr: 0.5 / Ag: 1.0 | Zr: 0.5 / Bi: 0.8 | Zr: 0.5 / Cu: 0.9 | Zr: 0.5 / Mo: 0.9 | Zr: 0.5 / Sb: 0.9 | Zr: 0.5 / Nb: 1.0 | Zr: 0.5 / Y: 1.4 |
| Carrier | Mordenite | Mordenite | Mordenite | 85% mordenite 15% acid clay | 85% mordenite 15% acid clay | 85% mordenite 15% acid clay | Mordenite |
| Reaction conditions: | | | | | | | |
| Pressure (kg./cm.$^2$ G) | 50 | 50 | 50 | 50 | 50 | 50 | 50 |
| H$_2$/toluene (molar ratio) | 5 | 5 | 5 | 5 | 5 | 5 | 5 |
| LHSV (hr.$^{-1}$) | 2 | 2 | 2 | 2 | 2 | 2 | 2 |
| Temperature (° C.) | 500 | 500 | 500 | 500 | 500 | 500 | 500 |
| Conversion of toluene (mole percent) | 54.4 | 54.6 | 52.0 | 53.6 | 54.8 | 52.2 | 55.0 |
| Disproportionation ratio (molar ratio) | 0.88 | 0.92 | 0.92 | 0.92 | 0.93 | 0.93 | 0.88 |
| Loss of aromatic components [mole percent] [2] | 1.2 | 1.4 | 1.3 | 1.1 | 1.1 | 1.3 | 1.2 |

[1] Disproportionation ratio is shown in molar ratio of resultant xylene/benzene.

[2] Loss of aromatic components = $\frac{\text{Non aromatics [mole percent]}}{\text{Toluene conversion [mole percent]}}$

REFERENCE EXPERIMENT 1–8

A boiling solution of 8 weight percent of ammonium nitrate was passed through pellets of mordenite of 4 mm. diameter and 4 mm. length to exchange the sodium ion of said mordenite with ammonium ion. The product was repeatedly washed with water to remove completely ammonium nitrate residue. The resultant product was dried at 150° C. and then was ion-exchanged to convert all or a part of the ammonium ion with one of the following metal ions, by adding an aqueous solution of the corresponding metal compound, in predetermined catalytic amounts, at 90° C. for 2 hours.

The resultant product was repeatedly washed with water and was dried and then was heated at 600° C. for 2 hours.

In these examples, the metal compounds used for said ion exchange were silver nitrate, bismuth nitrate, copper nitrate, ammonium molybdate, antimony trichloride, niobium nitrate or yttrium nitrate.

The disproportionation of toluene was carried out using 100 ml. of said catalyst, at 400° C.–500° C. under a pressure of 50 kg./cm.$^2$ G and liquid hourly space velocity [LHSV] of 2 hr.$^{-1}$, at a molar ratio of $H_2$ to toluene of 5:1.

The results of said disproportionation, using these catalysts are summarized in Table 2.

H-type mordenite, were respectively used for disproportionation of toluene. The results are shown in Table 4.

TABLE 2

| Reference experiment | 1 | 2 | 3 | 4 | 5 | 6 | 7 | 8 |
|---|---|---|---|---|---|---|---|---|
| Catalytic metal | Ag | Bi | Cu | Mo | Sb | Nb | Y | Zr |
| Amount of metal (wt. percent) | 1.0 | 0.8 | 0.9 | 0.9 | 0.9 | 1.2 | 1.4 | 1.1 |
| Carrier | Mordenite | Mordenite | Mordenite | 85% mordenite 15% acid clay | 85% mordenite 15% acid clay | Mordenite | Mordenite | Mordenite |
| Reaction conditions: | | | | | | | | |
| Pressure (kg./cm.$^2$ G) | 50 | 50 | 50 | 50 | 50 | 50 | 50 | 50 |
| H$_2$/toluene (molar ratio) | 5 | 5 | 5 | 5 | 5 | 5 | 5 | 0 |
| LHSV (hr.$^{-1}$) | 2 | 2 | 2 | 2 | 2 | 2 | 2 | 5 |
| Temperature (° C.) | 500 | 500 | 500 | 500 | 500 | 500 | 500 | 502 |
| Conversion of toluene (mole percent) | 52.7 | 52.5 | 51.0 | 51.1 | 52.3 | 52.0 | 52.3 | 49.0 |
| Disproportionation ratio (molar ratio) [1] | 0.78 | 0.86 | 0.90 | 0.86 | 0.77 | 0.84 | 0.89 | 0.87 |
| Loss of aromatic components [mole percent] [2] | 1.8 | 2.0 | 1.7 | 1.6 | 1.6 | 2.0 | 1.7 | 1.9 |

[1] Disproportionation ratio is molar ratio of resultant xylene/benzene.

[2] Loss of aromatic components = $\frac{\text{Non aromatics [mole percent]}}{\text{Toluene conversion [mole percent]}}$ As it is clear from the comparison of Examples 1–7 and Reference Experiments 1–8 in accordance with the combination of Zr to the other metal, the conversion of toluene was increased and the loss of aromatic components was decreased. In the conversion of the aromatic compounds such as a disproportionation of toluene, the ratio of the cost of the raw materials to the cost of the product is quite high. Accordingly, it is quite effective to decrease the formation of non-aromatics.

Similar tests were conducted using the catalysts of the Example 2 and Reference Experiment 2, at 400° C. under 40 kg./cm.$^2$ G of pressure, 1.5 hr.$^{-1}$ of LHSV and 10 mole/mole of H$_2$/TOL. The results are shown in Table 3.

TABLE 3

| Example | 8 | 9 |
|---|---|---|
| Catalytic metal | Bi | Ar–Bi |
| Amount of metal [wt. percent] | 1.0 | Zr: 0.5, Bi: 1.0 |
| Carrier | Mordenite | Mordenite |
| Reaction conditions: | | |
| Pressure [kg./cm.$^2$ G] | 40 | 40 |
| H$_2$/toluene [molar ratio] | 10 | 10 |
| LHSV [hr.$^{-1}$] | 1.5 | 1.5 |
| Temperature [° C.] | 400 | 400 |
| Conversion of toluene [mole percent] | 48.2 | 50.5 |
| Disproportionation ratio [molar ratio] | 0.88 | 0.90 |
| Non-aromatics yield [mole percent] | 0.6 | 0.3 |
| Methylcyclo pentane content in liquid product [mole p.p.m.] | 137 | 38 |
| Cyclohexane content in liquid product [mole p.p.m.] | 31 | 11 |

As it is clear from the results of the Table 3, is was found to be that the quantity of non-aromatics having boiling points similar to the boiling point of benzene such as methylcyclopentane and cyclohexane etc., were decreased when using the catalyst supporting a combination of Zr and another metal.

Since it is difficult to separate the non-aromatic components from benzene, by distillation, a decrease in the quantity of non-aromatics being obtained results in an increase in purity of the benzene. The operation of the benzene tower is thus made easier and the economics of the process is improved.

REFERENCE 9–11

In order to show the superiority of the new catalyst of this invention, to conventional catalysts characterized by high activity for the particular type of disproportionation; such as silica-alumina catalyst, H-type faujasite and H-type mordenite, were respectively used for disproportionation of toluene. The results are shown in Table 4.

TABLE 4

| Reference experiment | 9 | 10 | 11 |
|---|---|---|---|
| Catalyst | Silica-alumina | H-type faujasite | H-type mordenite |
| Reaction conditions: | | | |
| Reaction Pressure (kg./cm.$^2$ G) | 50 | 50 | 50 |
| H$_2$/toluene (molar ratio) | 5 | 5 | 5 |
| LHSV (hr.$^{-1}$) | 0.5 | 0.5 | 1 |
| Reaction temperature (° C.) | 500 | 500 | 500 |
| Conversion of toluene (percent) | 37.1 | 45.0 | 46.0 |
| Disproportionation ratio (molar ratio) [1] | 0.75 | 0.58 | 0.82 |

[1] Resultant xylene/benzene (molar ratio).

It is clear that the catalysts of this invention shown in Table 1, are superior to the conventional catalysts, shown in Table 4, in conversion of toluene and disproportionation ratio.

The thermodynamical equilibrium conversion of toluene to produce benzene, o-, m-, and p-xylene by disproportionation of toluene at 500° C. is 56.8%. Accordingly, the conversion made by using the catalyst of the invention is near the thermodynamical equilibrium conversion.

EXAMPLE 10–14 AND REFERENCE 12–15

Powder form mordenite and the binder were mixed and then about 200 weight percent of water was added to the mixture. The mixture was kneaded and shaped by the extruder and then was dried at 150° C. for 3 hours and was heated at 600° C. for 2 hours.

The pellets were dipped in an aqueous solution of 1 weight percent of zirconyl nitrate to effect ion-exchange. The product was then calcined at 600° C. for 2 hours to obtain the catalyst.

As a reference, the same process was repeated except without a binder in the catalyst (Reference 14) or with 15 weight percent of Kaolin (Reference 15). Each catalyst contained 1.1 weight percent of zirconium and had a 3 mm. diameter and a length of 7 mm. respectively. The results of crushing strength tests of the catalysts, and the disproportionation activities of toluene using said catalysts are shown in Table 5.

The measurement of crushing strength was made by pressing the catalyst with the hardness tester using a piston of 0.5 cm. of circular section.

The disproportionation of toluene was conducted at 500° C., at a pressure of 50 kg./cm.$^2$ G, and a space velocity LHSV of 2 hr.$^{-1}$. The molar ratio of H$_2$ to toluene was 5:1.

TABLE 5

| Example | 10 | 11 | 12 | 13* | 14 | 14* | 15 |
|---|---|---|---|---|---|---|---|
| Zeolite | Mordenite | Mordenite | Mordenite | Mordenite | Mordenite | Mordenite | Mordenite |
| Binder | Acid clay [1] | Activated clay [2] | Silica-alumina [3] | Silica-alumina [3] | Silica-alumina [3] | None | Kaolin |
| Rate of binder (wt. percent) | 15 | 15 | 15 | 3 | 50 | 0 | 15 |
| Crushing strength of catalyst (kg./0.5 cm. catalyst side) | 7.6 | 7.5 | 7.5 | 1.5 | 7.5 | 0.8 | 6.5 |
| Conversion of toluene (mole percent) | 52.6 | 52.3 | 49.8 | 49.7 | 49.6 | 49.7 | 43.5 |
| Resultant xylene/benzene (molar ratio) | 0.87 | 0.87 | 0.88 | 0.89 | 0.87 | 0.89 | 0.89 |

[1] About 130 m.²/g. of specific surface area.
[2] About 280 m.²/g. of specific surface area.
[3] Silica:alumina=87:13.
*Reference.

It is clear from the Table 5 that the catalyst using the binder of acid clay, activated clay or silica-alumina, respectively, have excellent strength and high catalytic activity, but the catalyst without the binder is characterized by low strength. The catalyst using Kaolin as a binder is characterized by low catalytic activity.

EXAMPLE 15

The disproportionation of m-xylene was conducted using 30 ml. of the catalyst of Example 2, at a temperature of 450° C. under a pressure of 25 kg./cm.² G and a liquid hourly space velocity (LHSV) of 2 hr.$^{-1}$. The molar ratio of $H_2$/m-xylene was 5:1.

The results are shown in Table 6.

TABLE 6

| | |
|---|---|
| Example | 15. |
| Added metal | Zr-Bi. |
| Amount of added metal (wt. percent) | Bi, 1.0. Zr, 0.5. Bi, 1.0. |
| Carrier | 85% mordenite. 15% acid clay. |
| Reaction condition: | |
| Pressure (kg./cm.² G) | 25 |
| H²/m-xylene (molar ratio) | 5 |
| LHSV (hr.$^{-1}$) | 2 |
| Temperature (° C.) | 450 |
| Reaction products (mole percent): | |
| Non-aromatics | 0.2 |
| Benzene | .088 |
| Toluene | 25.0 |
| m-Xylene | 27.7 |
| p-Xylene | 11.5 |
| O-xylene | 10.9 |
| 1,3,5-trimethylbenzene | 6.1 |
| 1,2,4-trimethylbenzene | 16.4 |
| 1,2,3-trimethylbenzene | 1.4 |

The disproportionation of m-xylene was quite good, and the ratio of isomers of xylene fraction of the reaction product are the same as the thermodynamical equilibrium. Accordingly, it is clear that the catalyst is quite effective for isomerization of alkyl aromatic hydrocarbon.

EXAMPLES 16-18

The transalkylation reactions of toluene and pseudocumene were made using 100 m. of the catalyst used in Example 1. The reaction conditions were 50 kg./cm.² G of reaction pressure, 5 molar ratio of $H_2$/Starting materials, 1 hr.$^{-1}$ of LHSV and 500° C. of reaction temperature.

The results are shown in Table 7.

TABLE 7

Catalyst: Zr [0.5 wt. percent]-Ag [1.0 wt. percent], mordenite

| Example | 16 | 17 | 18 |
|---|---|---|---|
| Starting material toluene (mole percent) | 75 | 50 | 25 |
| 1,2,4-trimethyl benzene (mole percent) | 25 | 50 | 75 |
| Xylene yield (mole percent) | 39.5 | 41.7 | 39.2 |
| Xylene/benzene production ratio (molar ratio) | 9.0 | 9.5 | 10.1 |

It is clear from Table 7 that excellent transalkylation of alkyl aromatic hydrocarbon is made by using the catalyst of this invention.

We also have found that the other catalysts were also quite active for the transalkylations of alkyl aromatic hydrocarbons as well as that Ar-Ag mordenite catalyst.

Having now fully described the invention, it will be apparent to one of ordinary skill in the art, that many changes and modifications can be made thereto without departing from the spirit or scope of the invention.

What is claimed as new and desired to be secured by Letters Patent of the United States is:

1. In a process for disproportionation and transalkylation of alkyl-aromatic hydrocarbon the improvement comprising effecting said disproportionation and transalkylation in the presence of a supported catalyst of a mordenite carrying a combination of 0.01 to 10 wt. percent Zr and 0.5 to 10 wt. percent of another metal selected from the group consisting of Bi, Nb, Ag, Cu, Mo, Sb, and Y.

2. The process for disproportionation and transalkylation of alkyl aromatic hydrocarbon according to Claim 1, wherein the catalyst is prepared by exchanging the alkali metal ion of the mordenite with said special catalytic metal ions.

3. The process of disproportionation and transalkylation of alkyl aromatic hydrocarbon according to Claim 1, wherein the alkyl aromatic hydrocarbon is selected from the group consisting of toluene, xylene, ethylbenzene, pseudocumene, mesitylene, ethyltoluene, hemimellitene, cumene, isodurene, durene and cymene.

4. The process for disproportionation and transalkylation of alkyl aromatic hydrocarbon according to Claim 1, wherein the alkyl aromatic hydrocarbon is converted in the presence of hydrogen gas.

5. The process for disproportionation and transalkylation of alkyl aromatic hydrocarbon according to Claim 1, wherein the mordenite is shaped with a binder selected from the group consisting of acid clay, activated clay and silica-alumina.

References Cited

UNITED STATES PATENTS

| 3,597,491 | 8/1971 | Kovach et al. | 260—672 T |
| 3,598,878 | 10/1971 | Kovach et al. | 260—672 T |
| 3,699,181 | 10/1972 | Kmecak et al. | 260—672 T |

CURTIS R. DAVIS, Primary Examiner